(12) United States Patent
Hu et al.

(10) Patent No.: US 12,489,785 B1
(45) Date of Patent: Dec. 2, 2025

(54) ANTI-EAVESDROPPING DISTRIBUTED FUSION FILTERING METHOD FOR MULTI-RATE NONLINEAR SYSTEMS

(71) Applicant: Harbin University of Science and Technology, Harbin (CN)

(72) Inventors: Jun Hu, Harbin (CN); Shuting Fan, Harbin (CN); Wen Chen, Harbin (CN); Hongxu Zhang, Harbin (CN); Chaoqing Jia, Harbin (CN); Hui Yu, Harbin (CN); Zhihui Wu, Harbin (CN)

(73) Assignee: Harbin University of Science and Technology, Harbin (CN)

( * ) Notice: Subject to any disclaimer, the term of this patent is extended or adjusted under 35 U.S.C. 154(b) by 0 days.

(21) Appl. No.: 19/006,280

(22) Filed: Dec. 31, 2024

(30) Foreign Application Priority Data

Apr. 9, 2024 (CN) .......................... 202410423443.5

(51) Int. Cl.
*H04L 9/40* (2022.01)
(52) U.S. Cl.
CPC .......... *H04L 63/1475* (2013.01); *H04L 63/04* (2013.01)
(58) Field of Classification Search
USPC ........................................................... 726/23
See application file for complete search history.

(56) References Cited

U.S. PATENT DOCUMENTS 9,479,217 B1 * 10/2016 Terry .................... H04L 27/001
2023/0176557 A1 * 6/2023 Cella .................... G05B 13/048
700/117

FOREIGN PATENT DOCUMENTS

CN 103326830 A * 9/2013 ............ H04W 72/04
CN 112800889 A * 5/2021 ............. G06F 18/25
(Continued)

OTHER PUBLICATIONS

Qu et al., "Event-Based Joint State and Unknown Input Estimation for Energy Networks: Handling Multi-Machine Power Grids", Jan., Feb. 2023, IEEE Transactions of Network Science and Engineering, vol. 10, No. 1, pp. 253-264 (Year: 2023).*

*Primary Examiner* — Sakinah White Taylor
(74) *Attorney, Agent, or Firm* — Bayramoglu Law Offices LLC

(57) ABSTRACT

An anti-eavesdropping distributed fusion filtering method for the multi-rate nonlinear system over sensor network includes: Step 1, establishing a dynamic model for the multi-rate nonlinear system over sensor network; Step 2, transforming the multi-rate nonlinear system dynamic model into a single-rate nonlinear system dynamic model through the prediction compensation strategy; Step 3, designing an anti-eavesdropping distributed fusion filter; Step 4, calculating an upper bound on the one-step prediction error covariance $\aleph(t_{k+1}|t_k)$; Step 5, deriving the local distributed filter parameter $K_i(t_{k+1})$; Step 6, deriving the selection matrix $L_{ij}(t_{k+1})$; Step 7, substituting $K_i(t_{k+1})$ and $L_{ij}(t_{k+1})$ into Step 3 to obtain the fusion filter $\hat{x}_{Cf}(t_{k+1}|t_{k+1})$; Step 8, solving for the upper bound on the local filtering error covariance $\aleph_i(t_{k+1}|t_{k+1})$. The method solves the problem that the existing fusion filtering method cannot simultaneously deal with the filtering problem for multi-rate nonlinear systems with eavesdroppers and fading measurements, thereby improving the accuracy of the filtering performance.

8 Claims, 8 Drawing Sheets

(56) References Cited

FOREIGN PATENT DOCUMENTS

| CN | 116047495 A | * | 5/2023 | ............. | G06F 17/13 |
| CN | 117082502 B | * | 12/2023 | ............ | H04W 12/03 |

* cited by examiner

ANTI-EAVESDROPPING DISTRIBUTED FUSION FILTERING METHOD FOR MULTI-RATE NONLINEAR SYSTEMS

CROSS REFERENCE TO THE RELATED APPLICATIONS

This application is based upon and claims priority to Chinese Patent Application No. 202410423443.5, filed on Apr. 9, 2024, the entire contents of which are incorporated herein by reference.

TECHNICAL FIELD

The present invention relates to a distributed filtering method, in particular to an anti-eavesdropping distributed fusion filtering method for multi-rate nonlinear systems with fading measurements over sensor networks.

BACKGROUND

In recent years, sensor networks have garnered widespread attention for their applications including environmental monitoring, intelligent transportation, industrial control and healthcare, where the filtering algorithm design over sensor networks has emerged as a research focus. Common filtering algorithms include centralized and distributed filtering algorithms. Compared with the former, the distributed filtering algorithm has attracted the research interest of scholars due to its higher reliability, stronger fault tolerance and better scalability. In order to address the limitations of individual sensors, multi-sensor fusion technology has been proposed. Furthermore, systems are often nonlinear in practical engineering, and the sampling rates of different components are generally different because different system components have different physical properties. Therefore, it is of practical significance to investigate the distributed fusion filtering problem for multi-rate nonlinear systems over sensor networks.

Since the communication channel with limited bandwidth cannot accommodate large amounts of data transmission, it may lead to network congestion and fading measurements. In this case, filters may only receive incomplete data, inevitably diminishing the accuracy of filtering algorithms. Thus, it is important to study the influence of fading measurements on the distributed fusion filtering algorithm. On the other hand, considering the openness and sharing nature of sensor networks, the data transmission between sensor nodes is susceptible to eavesdropping. Eavesdroppers could potentially exploit intercepted information to analyze the network topology and then launch broader and more severe cyber-attacks, thereby undermining the security and stability of the network. Hence, effective measures should be implemented to safeguard information security within sensor networks.

The existing distributed fusion filtering methods struggle to concurrently address the filtering issues for multi-rate nonlinear systems with fading measurements and eavesdropping, which can adversely impact filtering performance. Therefore, devising an eavesdropping-resistant distributed filtering approach that accounts for fading measurements holds practical significance.

SUMMARY

In order to address the problem that the existing fusion filtering method cannot simultaneously handle the filtering problem for multi-rate nonlinear systems with eavesdroppers and fading measurements, resulting in low accuracy of filtering performance, the present invention provides an anti-eavesdropping distributed fusion filtering method for multi-rate nonlinear systems.

The present invention adopts the following technical solution.

An anti-eavesdropping distributed fusion filtering method for a multi-rate nonlinear system includes the following steps:

Step 1: establishing a dynamic model for the multi-rate nonlinear system over sensor networks:

$$x(t_{k+1}) = f(x(t_k)) + B(t_k)\omega(t_k)$$
$$y_i(s_k) = \Lambda_i(s_k) C_i(s_k) x(s_k) + v_i(s_k)$$

wherein, $t_k$ is a state update instant of the multi-rate nonlinear system; $x(t_k)$ is a state vector of the multi-rate nonlinear system at time $t_k$; $x(t_{k+1})$ is a state vector of the multi-rate nonlinear system at time $t_{k+1}$; $f(x(t_k))$ is a continuous and differentiable nonlinear function with a bounded second-order derivative of the multi-rate nonlinear system at time $t_k$; $B(t_k)$ is a coefficient matrix of process noise at time $t_k$; $\omega(t_k)$ is process noise with zero mean and covariance $Q(t_k)$ at time $t_k$; $i$ is a label of sensor nodes, $i=1,2,\ldots,N$, N represents a number of sensor nodes; $s_k$ is a measurement sampling instant of sensor; $x(s_k)$ is a state vector of the multi-rate nonlinear system at time $s_k$; $y_i(s_k)$ is a measurement output signal of an i-th sensor node in the multi-rate nonlinear system at time $s_k$; $C_i(s_k)$ is a measurement matrix of the i-th sensor node based on the multi-rate nonlinear system at time $s_k$; $v_i(s_k)$ is measurement noise of the i-th sensor node in the multi-rate nonlinear system at time $s_k$; $\Lambda_i(s_k)$ is used to describe a phenomenon of fading measurements;

Step 2: transforming the dynamic model for the multi-rate nonlinear system over sensor networks in Step 1 into a single-rate nonlinear system dynamic model through a prediction compensation strategy:

$$\bar{y}_i(t_k) = (1 - \beta(t_k))\bar{\Lambda}_i C_i(t_k)\hat{x}_i(t_k \mid t_{k-1}) + \beta(t_k) y_i(t_k)$$

$$\beta(t_k) = \begin{cases} 1, & t_k = s_t,\ t = 0, 1, 2, \ldots \\ 0, & \text{otherwise} \end{cases}$$

wherein, $\bar{y}_i(t_k)$ is a measurement output signal of the i-th sensor node in a single-rate nonlinear system at time $t_k$; $\beta(t_k)$ is an auxiliary variable; $C_i(t_k)$ is a measurement matrix of the i-th sensor node based on the single-rate nonlinear system at time $t_k$; $\hat{x}_i(t_k|t_{k-1})$ is a one-step prediction of the i-th sensor node at time $t_{k-1}$; $\bar{\Lambda}_i = \text{diag}\{\bar{\lambda}_{i1}, \bar{\lambda}_{i2}, \ldots, \bar{\lambda}_{in_y}\}$; $n_y$ is a dimension of $y_i(s_k)$; $\bar{\lambda}_{iu}$ is an expectation of a random variable $\lambda_{iu}(s_k)$, $u=1,2,\ldots,n_y$; $y_i(t_k)$ is a measurement output signal of the i-th sensor node in the multi-rate nonlinear system at time $t_k$; $s_t$ is the measurement sampling instant of sensor node;

Step 3: designing an anti-eavesdropping distributed fusion filter for the single-rate nonlinear system dynamic model in Step 2; wherein Step 3a: when a sensor node exchanges information, in order to prevent transmitted data from being eavesdropped by an eavesdropper and ensure a security of information transmission, adding artificial noise to the one-step prediction $\hat{x}_j(t_k|t_{k-1})$ of a sensor node j before $\hat{x}_j(t_k|t_{k-1})$ being sent to the sensor node i:

$$\hat{x}_{ij}^o(t_k) = L_{ij}(t_k)\hat{x}_j(t_k | t_{k-1}) + (I - L_{ij}(t_k))a_{ij}(t_k)$$

wherein, $j \in N_i$, $N_i$ is a set of neighboring nodes of the i-th sensor node; $\hat{x}_j(t_k|t_{k-1})$ represents a one-step prediction of the j-th sensor node at time $$t_{k-1}; \hat{x}_{ij}^o(t_k)$$

is a transmitted message from the sensor node j to the sensor node i at time $t_k$; I is an $n_x$-dimensional identity matrix; $n_x$ is a dimension of the state vector $x(t_k)$; $a_{ij}(t_k)$ is the artificial noise with zero mean and covariance $Q_{ij}(t_k)$ at time $t_k$; $L_{ij}(t_k)$ is a selection matrix at time $t_k$;

Step 3b: when the sensor node i receives the information $$\hat{x}_{ij}^o(t_k)$$

transmitted by the sensor node j, obtaining a compensated one-step prediction at time $t_k$ according to a zero-order holder compensation rule:

$$\hat{x}_{ij}^c(t_k)$$

wherein, $$\hat{x}_{ij}^c(t_k) = L_{ij}(t_k)\hat{x}_{ij}^o(t_k) + (I - L_{ij}(t_k))\hat{x}_{ij}^c(t_{k-1})$$

is the compensated one-step prediction at time $t_k$;

$$\hat{x}_{ij}^c(t_{k-1})$$

is a compensated one-step prediction at time $t_{k-1}$;

Step 3c: designing a local distributed filter:

$$\hat{x}_i(t_{k+1} | t_k) = f(\hat{x}_i(t_k | t_k))$$

$$\hat{x}_i(t_{k+1} | t_{k+1}) = \hat{x}_i(t_{k+1} | t_k) +$$
$$K_i(t_{k+1})(\bar{y}_i(t_{k+1}) - \bar{\Lambda}_i C_i(t_{k+1})\hat{x}_i(t_{k+1} | t_k)) + \varepsilon_i \sum_{j \in N_i} h_{ij}(\hat{x}_i(t_{k+1} | t_k) - \hat{x}_{ij}^c(t_{k+1}))$$

wherein, $\hat{x}_i(t_{k+1}|t_k)$ represents a one-step prediction of the i-th sensor node at time $t_k$;

$$\hat{x}_{ij}^c(t_{k+1})$$

represents a compensated one-step prediction at time $t_{k+1}$; $\hat{x}_i(t_{k+1}|t_{k+1})$ represents a filter of the i-th sensor node at time $t_{k+1}$; $\hat{x}_i(t_k|t_k)$ represents a filter of the i-th sensor node at time $t_k$; $f(\hat{x}_i(t_k|t_k))$ represents a nonlinear function filtering form based on the single-rate nonlinear system of the i-th sensor node at time $t_k$; $\bar{K}_i(t_{k+1})$ represents a local distributed filter parameter of the i-th sensor node at time $t_{k+1}$; $\bar{y}_i(t_{k+1})$ represents a measurement output signal of the i-th sensor node in the single-rate nonlinear system at time $t_{k+1}$; $C_i(t_{k+1})$ is a measurement matrix of the i-th sensor node based on the single-rate nonlinear system at time $t_{k+1}$; $\varepsilon_i$ represents a predefined consensus parameter of the i-th sensor node; $h_{ij}$ represents a connection coefficient between the i-th sensor node and the j-th sensor node; and Step 3d: obtaining an anti-eavesdropping distributed fusion filter based on a local filter $\hat{x}_i(t_k|t_k)$ and a covariance intersection fusion criterion:

$$\aleph_{CI}(t_k | t_k) = \left(\sum_{i=1}^{N} \omega_i \aleph_i^{-1}(t_k | t_k)\right)^{-1}$$

$$\hat{x}_{CI}(t_k | t_k) = \aleph_{CI}(t_k | t_k) \sum_{i=1}^{N} \omega_i \aleph_i^{-1}(t_k | t_k)\hat{x}_i(t_k | t_k)$$

wherein, a superscript "−1" represents an inverse of a matrix; $\hat{x}_{CI}(t_k|t_k)$ is a fusion filter at time $t_k$; $\aleph_{CI}(t_k|t_k)$ is fusion filtering error covariance at time $t_k$; $\aleph_i(t_k|t_k)$ is an upper bound on a local filtering error covariance of the i-th sensor node at time $t_k$; $\aleph_i^{-1}(t_k|t_k)$ is an inverse of a matrix $$\aleph_i(t_k | t_k); \left(\sum_{i=1}^{N} \omega_i \aleph_i^{-1}(t_k | t_k)\right)^{-1}$$

is an inverse of a matrix $$\sum_{i=1}^{N} \omega_i \aleph_i^{-1}(t_k | t_k);$$

$\omega_i$ is a scalar;

Step 4: calculating an upper bound on the one-step prediction error covariance $\aleph_i(t_{k+1}|t_k)$ of the i-th sensor node at time $t_k$ by solving a matrix difference equation:

$$\aleph_i(t_{k+1}|t_k) = (1 + \delta_1)A_i(t_k)\aleph_i(t_k|t_k)A_i^T(t_k) +$$
$$B(t_k)Q(t_k)B^T(t_k) + (1 + \delta_1^{-1})tr\{M_i(t_k)\aleph_i(t_k|t_k)M_i^T(t_k)\}D_i(t_k)D_i^T(t_k)$$

wherein, a superscript "T" represents the transpose of a matrix; $\delta_1$ is a known scaling parameter; $\delta_1^{-1}$ is an inverse of $\delta_1$; $A_i(t_k)$ is a partial derivative of the continuous and differentiable nonlinear function $f(x(t_k))$ corresponding to a system state at the local filter $\hat{x}_i(t_k|t_k)$ at time $t_k$; $M_i(t_k)$ and $D_i(t_k)$ are known error matrices obtained by Taylor series based on $f(x(t_k))$;

$$A_i^T(t_k),$$

$$B^T(t_k),$$

$$M_i^T(t_k)$$

and $$D_i^T(t_k)$$

represent transposes of $A_i(t_k)$, $B(t_k)$, $M_i(t_k)$ and $D_i(t_k)$, respectively;

Step 5: according to $\aleph_i(t_{k+1}|t_k)$ obtained in Step 4, deriving the local distributed filter parameter $K_i(t_{k+1})$ of the i-th sensor node at time $t_{k+1}$ by minimizing a trace of the upper bound on the local filtering error covariance:

$$K_i(t_{k+1}) = \delta(\beta(t_{k+1}),1)(1+\grave{o}_2)\aleph_i(t_{k+1}|t_k)C_i^T(t_{k+1})\overline{A}_i\Pi_i^{-1}(t_{k+1})$$

wherein, $$\prod_i(t_{k+1}) =$$
$$(1+\grave{o}_2)\overline{A}_iC_i(t_{k+1})\aleph_i(t_{k+1}|t_k)C_i^T(t_{k+1})\overline{A}_i + tr\{C_i(t_{k+1})\overline{X}_i(t_{k+1})C_i^T(t_{k+1})\}\hat{A}_i +$$
$$R_i(t_{k+1})\overline{X}_i(t_{k+1}) = (1+\grave{o}_3^{-1})\hat{x}_i(t_{k+1}|t_k)\hat{x}_i^T(t_{k+1}|t_k) + (1+\grave{o}_3)\aleph_i(t_{k+1}|t_k)$$

wherein, $\delta(a,b)$ is a Kronecker function; $\beta(t_{k+1})$ is an auxiliary variable at time $t_{k+1}$; $\grave{o}_2$ and $\grave{o}_3$ are known scaling parameters; $\grave{o}_3^{-1}$ is an inverse of $\grave{o}_3$; $C_i^T(t_{k+1})$ is a transpose of $C_i(t_{k+1})$;

$$\hat{x}_i^T(t_{k+1}|t_k)$$

is a transpose of $\hat{x}_i(t_{k+1}|t_k)$; $\Pi_i^{-1}(t_{k+1})$ is an inverse of $\Pi_i(t_{k+1})$; $R_i(t_{k+1})$ is a covariance matrix of measurement noise $v_i(t_{k+1})$ of the i-th sensor node at time $t_{k+1}$;

Step 6: by maximizing an estimation error covariance of the eavesdropper, deriving the selection matrix $L_{ij}(t_{k+1})$ at time $t_{k+1}$ from the following optimization problem:

$$\max_{L_{ij}(t_{k+1}) \in \hat{L}_{ij}(t_{k+1})} tr\{W_{ij}(t_{k+1})\}$$

wherein, $$W_{ij}(t_{k+1}) = (I - L_{ij}(t_{k+1}))(2\hat{x}_j(t_{k+1}|t_k)\hat{x}_j^T(t_{k+1}|t_k) + Q_{ij}(t_{k+1}))(I - L_{ij}(t_{k+1}))$$

wherein, $$\hat{L}_{ij}(t_{k+1}) = \{L_{ij}^1(t_{k+1}), L_{ij}^2(t_{k+1}), \ldots, L_{ij}^d(t_{k+1})\},$$

$$L_{ij}^1(t_{k+1}), L_{ij}^2(t_{k+1}), \ldots, L_{ij}^{d_j}(t_{k+1})$$

are diagonal matrices with elements of 0 or 1 and a sum of the diagonal elements are $\tilde{n}_i$; $\hat{x}_j(t_{k+1}|t_k)$ represents a one-step prediction of the j-th sensor node at time $$t_k; \hat{x}_j^T(t_{k+1}|t_k)$$

is a transpose of $\hat{x}_j(t_{k+1}|t_k)$; $Q_{ij}(t_{k+1})$ is a covariance matrix of artificial noise $a_{ij}(t_{k+1})$ at time $t_{k+1}$;

$$\max_x f(x)$$

represents that an objective function $f(x)$ is maximized by selecting a decision variable $x$;

Step 7: substituting $K_i(t_{k+1})$ obtained in Step 5 and $L_{ij}(t_{k+1})$ obtained in Step 6 into Step 3 to obtain the fusion filter $\hat{x}_{Ci}(t_{k+1}|t_{k+1})$ at time $t_{k+1}$; determining whether $t_{k+1}$ reaches a total duration M, if $t_{k+1}<M$, performing Step 8, otherwise, ending;

Step 8: based on $K_i(t_{k+1})$ obtained in Step 5 and $L_{ij}(t_{k+1})$ obtained in Step 6, solving for the upper bound on the local filtering error covariance $\aleph_i(t_{k+1}|t_{k+1})$ of the i-th sensor node at time $t_{k+1}$:

$$\aleph_i(t_{k+1}|t_{k+1}) = (1-\beta(t_{k+1}))\Delta_i(t_{k+1}) + \beta(t_{k+1})\Theta_i(t_{k+1})$$

wherein, $$\Delta_i(t_{k+1}) = (1+\grave{o}_2)\aleph_i(t_{k+1}|t_k) + (1+\grave{o}_2^{-1})\varepsilon_i^2 \emptyset_i \sum_{j \in N_i} h_{ij} X_{ij}(t_{k+1}) X_{ij}^T(t_{k+1})$$

$$\Theta_i(t_{k+1}) =$$
$$(1+\grave{o}_2)(I - K_i(t_{k+1})\overline{A}_iC_i(t_{k+1}))\aleph_i(t_{k+1}|t_k)(I - K_i(t_{k+1})\overline{A}_iC_i(t_{k+1}))^T +$$
$$(1+\grave{o}_2^{-1})\varepsilon_i^2 \emptyset_i \sum_{j \in N_i} h_{ij} X_{ij}(t_{k+1}) X_{ij}^T(t_{k+1}) K_i(t_{k+1}) R_i(t_{k+1}) K_i^T(t_{k+1}) +$$
$$tr\{C_i(t_{k+1})\overline{X}_i(t_{k+1})C_i^T(t_{k+1})\}\overline{A}_i K_i(t_{k+1}) K_i^T(t_{k+1})$$
$$X_{ij}(t_{k+1}) = L_{ij}(t_{k+1})\tilde{x}_{ij}(t_{k+1}) + (I - L_{ij}(t_{k+1}))\tilde{x}_{ij}^c(t_{k+1})$$
$$\tilde{x}_{ij}^c(t_{k+1}) = \hat{x}_i(t_{k+1}|t_k) - \hat{x}_{ij}^c(t_k), \tilde{x}_{ij}(t_{k+1}) = \hat{x}_i(t_{k+1}|t_k) - \hat{x}_j(t_{k+1}|t_k)$$

wherein, $\grave{o}_2^{-1}$ is an inverse of $\grave{o}_2$; $\varepsilon_i^2$ is a square of $\varepsilon_i$; $\aleph_i(t_{k+1}|t_{k+1})$ is the upper bound on the local filtering error covariance of the i-th sensor node at time $t_{k+1}$;

$$K_i^T(t_{k+1})$$

is a transpose of $K_i(t_{k+1})$;

$$X_{ij}^T(t_{k+1})$$

is a transpose of $X_{ij}(t_{k+1})$; $(I-K_i(t_{k+1})\overline{A}_iC_i(t_{k+1}))^T$ is a transpose of $I-K_i(t_{k+1})\overline{A}_iC_o(t_{k+1})$; $\emptyset_i$ represents a penetration of the i-th sensor node;

let $t_k=t_{k+1}$ and performing Step 3 until $t_{k+1}=M$ is satisfied.

Compared with the prior art, the present invention has the following advantages.

The present invention simultaneously takes into account the influence of eavesdroppers and fading measurements on the filtering performance, obtaining the minimum upper bound on the local filtering error covariance based on the Riccati differential equation. In particular, during the information transmission between sensor nodes, artificial noise is introduced to achieve the purpose of eavesdropping resistance.

The present invention employs a recursive approach to estimate the states of multi-rate nonlinear systems, which is advantageous for its solvability and suitability for online implementation. At the same time, such fusion filtering problems can be categorized into centralized and distributed fusion filtering issues. Notably, in the centralized fusion filtering method, the measurement outputs from all sensor nodes must be expressed in a compact form, which incurs high computational costs for sensor networks with large nodes. In contrast, the distributed fusion filtering method utilized in the present invention has a lower computational burden.

The present invention addresses the limitations of existing fusion filtering methods in handling multi-rate nonlinear systems that are subject to eavesdroppers and fading measurements, thereby enhancing the accuracy of filtering performance for such issues. It can be seen from the simulation figures that the average mean square error of the fusion filter decreases as the increases of fading probability $\bar{\lambda}_{iu}$. Specifically, when a fading probability rises from 0.3 to 0.7, an average mean square error is reduced by approximately 37%; and when it increases from 0.7 to 0.8, a reduction is approximately 88%.

DETAILED DESCRIPTION OF THE EMBODIMENTS

The embodiment of the present invention is further described in detail hereinafter in conjunction with the figures.

Figure 1:
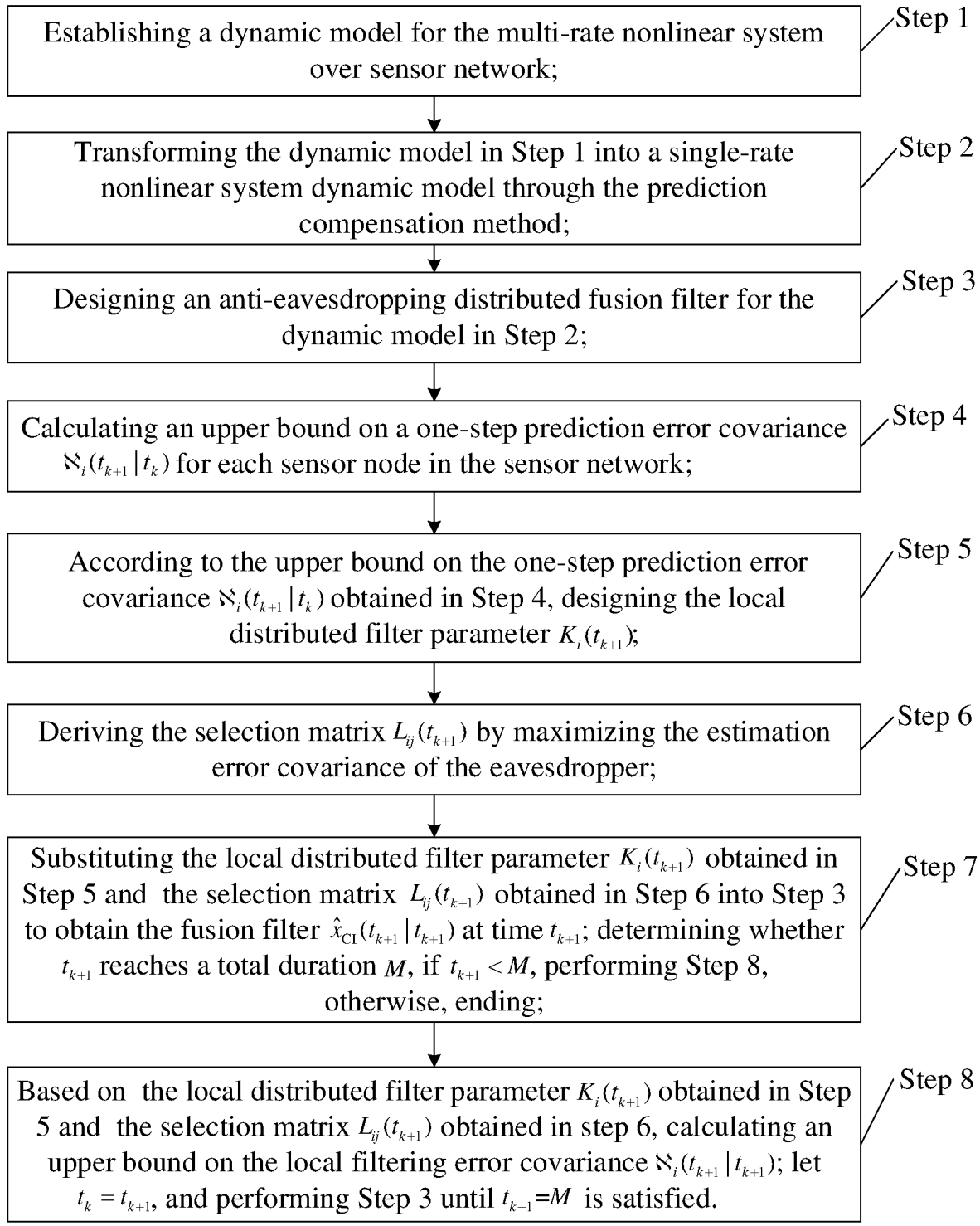
FIG. 1 shows a diagram of the anti-eavesdropping distributed fusion filtering algorithm.

The present invention provides an anti-eavesdropping distributed fusion filtering algorithm, as shown in FIG. 1, the present invention includes the following detailed steps:

Step 1: establishing a dynamic model for the multi-rate nonlinear system over sensor networks;

in this step, establishing a dynamic model for the multi-rate nonlinear system over sensor networks:

$$x(t_{k+1}) = f(x(t_k)) + B(t_k)\omega(t_k) \quad (1)$$

$$y_i(s_k) = \Lambda_i(s_k)C_i(s_k)x(s_k) + v_i(s_k)$$

wherein, $t_k$ is a state update instant of the multi-rate nonlinear system, any two adjacent state update instants $t_k$ and $t_{k+1}$ satisfy $t_{k+1}-t_k=h$, $h>0$ is the state update period of the multi-rate nonlinear system; $x(t_k)$ is a state vector of the multi-rate nonlinear system at time $t_k$; $x(t_{k+1})$ is a state vector of the multi-rate nonlinear system at time $t_{k+1}$; $f(x(t_k))$ is a continuous and differentiable nonlinear function with a bounded second-order derivative of the multi-rate nonlinear system at time $t_k$; $B(t_k)$ is a coefficient matrix of process noise at time $t_k$; $\omega(t_k)$ is process noise with zero mean and covariance $Q(t_k)$ at time $t_k$; i is a label of sensor nodes, i=1,2, ..., N, N represents a number of sensor nodes; $s_k$ is a measurement sampling instant of sensor, any two adjacent measurement sampling instants $s_k$ and $s_{k+1}$ satisfy $s_{k+1}-s_k=$bh, bh is a measurement sampling period of sensor node, b is a positive integer; $x(s_k)$ is a state vector of the multi-rate nonlinear system at time $s_k$; $y_i(s_k)$ is a measurement output signal of an i-th sensor node in the multi-rate nonlinear system at time $s_k$; $C_i(s_k)$ is a measurement matrix of the i-th sensor node based on the multi-rate nonlinear system at time $s_k$; $v_i(s_k)$ is measurement noise of the i-th sensor node in the multi-rate nonlinear system at time $s_k$ with zero mean and covariance $R_i(s_k)$; $\Lambda_i(s_k)$=diag $\{\lambda_{i1}(s_k),\lambda_{i2}(s_k), \ldots, \lambda_{in_y}(s_k)\}$ is used to describe a phenomenon of fading measurements, diag{□} represents a diagonal matrix composed of elements "□"; $n_y$ is a dimension of the measurement output vector $y_i(s_k)$; the elements $\lambda_{iu}(s_k)$ (u=1,2, ..., $n_y$) are random variables distributed over an interval [0,1], which meet $E\{\lambda_{iu}(s_k)\}=\bar{\lambda}_{iu}$ and $$E\{(\lambda_{iu}(s_k) - \bar{\lambda}_{iu})^2\} = E\{\tilde{\lambda}_{iu}^2(s_k)\} = \hat{\lambda}_{iu},$$

$\bar{\lambda}_{iu}$ and $\hat{\lambda}_{iu}$ are expectation and variance of the random variable $\lambda_{iu}(s_k)$, respectively, E{{□}} is a mathematical expectation;

Step 2: transforming the multi-rate nonlinear system dynamic model over sensor networks in Step 1 into a single-rate nonlinear system dynamic model through a prediction compensation strategy: wherein detailed steps are as follows:

for the sensor node i, defining the auxiliary variable $\beta(t_k)$:

$$\beta(t_k) = \begin{cases} 1, & t_k = s_t, t = 0, 1, 2, \ldots \\ 0, & \text{otherwise} \end{cases}$$

obtaining the measurement output model of the single-rate nonlinear system as follows:

$$\bar{y}_i(t_k)=(1-\beta(t_k))\bar{\Lambda}_i C_i(t_k)\hat{x}_i(t_k|t_{k-1})+\beta(t_k)y_i(t_k) \quad (2)$$

wherein, $s_t$ (t=0,1,2, ...) is the measurement sampling instant of sensor node; $\bar{y}_i(t_k)$ is a measurement output signal of the i-th sensor node in a single-rate nonlinear system at time $t_k$; $C_i(t_k)$ is a measurement matrix of the i-th sensor node based on the single-rate nonlinear system at time $t_k$; $\hat{x}_i(t_k|t_{k-1})$ is a one-step prediction of the i-th sensor node at time $t_{k-1}$; $\bar{\Lambda}_i$=diag$\{\bar{\lambda}_{i1},\bar{\lambda}_{i2}, \ldots, \bar{\lambda}_{in_y}\}$; $y_i(t_k)$ is a measurement output signal of the i-th sensor node in the multi-rate nonlinear system at time $t_k$;

Step 3: designing an anti-eavesdropping distributed fusion filter for the single-rate nonlinear system dynamic model in Step 2; wherein detailed steps are as follows:

Step 3a: when a sensor node exchanges information, in order to prevent transmitted data from being eavesdropped by an eavesdropper and ensure a security of information transmission, adding artificial noise to the one-step prediction $\hat{x}_j(t_k|t_{k-1})$ of a sensor node j (j∈$N_i$) before $\hat{x}_j(t_k|t_{k-1})$ being sent to the sensor node i:

$$\hat{x}_{ij}^o(t_k) = L_{ij}(t_k)\hat{x}_j(t_k \mid t_{k-1}) + (I - L_{ij}(t_k))a_{ij}(t_k) \quad (3)$$

wherein, $N_i$ is a set of neighboring nodes of the i-th sensor node; $\hat{x}_j(t_k|t_{k-1})$ is a one-step prediction of the j-th sensor node at time $t_{k-1}$;

$$\hat{x}_{ij}^o(t_k)$$

is a transmitted message from the sensor node j to the sensor node i at time $t_k$; I is an $n_x$-dimensional identity matrix, $n_x$ is a dimension of the state vector $x(t_k)$; $a_{ij}(t_k)$ is the artificial noise with zero mean and covariance $Q_{ij}(t_k)$ at time $t_k$;

$$L_{ij}(t_k) = \text{diag}\{\ell_{ij}^1(t_k), \ell_{ij}^2(t_k), \ldots, \ell_{ij}^{n_x}(t_k)\}$$

is a selection matrix at time $t_k$, elements $$\ell_{ij}^1(t_k), \ell_{ij}^2(t_k), \ldots, \ell_{ij}^{n_x}(t_k)$$

satisfy $$\ell_{ij}^m(t_k) \in \{0, 1\}(m = 1, 2, \ldots, n_X)$$

and $$\sum_{m=1}^{n_x} \ell_{ij}^m(t_k) = \tilde{n}_i, \tilde{n}_i$$

is a constant that is pre-designed according to an actual demand; "$\Sigma$" is a summation symbol. In addition, $L_{ij}(t_k) \in \hat{L}_{ij}(t_k)$, wherein, $$\hat{L}_{ij}(t_k) = \{L_{ij}^1(t_k), L_{ij}^2(t_k), \ldots, L_{ij}^{d}(t_k)\}, L_{ij}^1(t_k), L_{ij}^2(t_k), \ldots,$$

$$L_{ij}^{d_i}(t_k)$$

are all diagonal matrices with elements of 0 or 1 and the sum of the diagonal elements is ñ, $$d_i = C_{n_x}^{\tilde{n}_i}, C_{n_x}^{\tilde{n}_i}$$

represents a number of combinations;

Step 3b: when the sensor node i receives the information $$\hat{x}_{ij}^o(t_k)$$

transmitted by the sensor node j, obtaining a compensated one-step prediction at time $t_k$ according to a zero-order holder compensation rule:

$$\hat{x}_{ij}^c(t_k) = L_{ij}(t_k)\hat{x}_{ij}^o(t_k) + (I - L_{ij}(t_k))\hat{x}_{ij}^c(t_{k-1}) \quad (4)$$

wherein, $$\hat{x}_{ij}^c(t_k)$$

is the compensated one-step prediction at time $t_k$, $$\hat{x}_{ij}^c(t_{k-1})$$

is a compensated one-step prediction at time $t_{k-1}$;

Step 3c: designing a local distributed filter:

$$\hat{x}_i(t_{k+1}|t_k) = f(x, (\hat{x}_j(t_k|t_k))) \quad (5)$$

$$\hat{x}_i(t_{k+1} \mid t_{k+1}) = \hat{x}_i(t_{k+1} \mid t_k) + K_i(t_{k+1})(\bar{y}_i(t_{k+1}) - \overline{A}_i C_i(t_{k+1})\hat{x}_i(t_{k+1} \mid t_k)) + \varepsilon_i \sum_{j \in N_i} h_{ij}(\hat{x}_i(t_{k+1} \mid t_k) - \hat{x}_{ij}^c(t_{k+1})) \quad (6)$$

wherein, $\hat{x}_i(t_{k+1}|t_k)$ represents a one-step prediction of the i-th sensor node at time $t_k$;

$$\hat{x}_{ij}^c(t_{k+1})$$

represents a compensated one-step prediction at time $t_{k+1}$; $\hat{x}_i(t_{k+1}|t_{k+1})$ represents a filter of the i-th sensor node at time $t_{k+1}$; $\hat{x}_i(t_k|t_k)$ represents a filter of the i-th sensor node at time $t_k$; $f(\hat{x}_i(t_k|t_k))$ represents a nonlinear function filtering form based on the single-rate nonlinear system of the i-th sensor node at time $t_k$; $K_i(t_{k+1})$ represents a local distributed filter parameter of the i-th sensor node at time $t_{k+1}$; $\bar{y}_i(t_{k+1})$ represents a measurement output signal of the i-th sensor node in the single-rate nonlinear system at time $t_{k+1}$; $C_i(t_{k+1})$ is a measurement matrix of the i-th sensor node based on the single-rate nonlinear system at time $t_{k+1}$; $\varepsilon_i$ represents a predefined consensus parameter of the i-th sensor node; $h_{ij}$ represents a connection coefficient between the i-th sensor node and the j-th sensor node; and Step 3d: obtaining the distributed fusion filter based on a local filter $\hat{x}_i(t_k|t_k)$ (i=1,2, ..., N) and a covariance intersection fusion criterion:

$$\aleph_{CI}(t_k \mid t_k) = \left(\sum_{i=1}^{N} \omega_i \aleph_i^{-1}(t_k \mid t_k)\right)^{-1}, \hat{x}_{CI}(t_k \mid t_k) = \aleph_{CI}(t_k \mid t_k)\sum_{i=1}^{N} \omega_i \aleph_i^{-1}(t_k \mid t_k)\hat{x}_i(t_k \mid t_k) \quad (7)$$

wherein, a superscript "−1" represents an inverse of a matrix; $\hat{x}_{CI}(t_k|t_k)$ is a fusion filter at time $t_k$; $\aleph_{CI}(t_k|t_k)$ is fusion filtering error covariance at time $t_k$; $\aleph_i(t_k|t_k)$ is an upper bound on a local filtering error covariance of the i-th sensor node at time $t_k$; $\aleph_i^{-1}(t_k|t_k)$ is an inverse of a matrix $$\aleph_i(t_k | t_k); \left(\sum_{i=1}^{N} \omega_i \aleph_i^{-1}(t_k | t_k)\right)^{-1}$$

is an inverse of a matrix $$\sum_{i=1}^{N} \omega_i \aleph_i^{-1}(t_k | t_k);$$

$\omega_i$ is a scalar, which can be obtained by a following optimization problem:

$$\min_{\omega_i} \ tr\{\aleph_{CI}(t_k | t_k)\} \quad (8)$$
$$\text{s.t.} \ \sum_{i=1}^{N} \omega_i = 1, \omega_i \geq 0$$

wherein, $tr\{\square\}$ is a trace of a corresponding matrix;

$$\min_x f(x)$$

means that the objective function $f(x)$ is minimized by selecting the decision variable x, s.t. is an abbreviation for "subject to";

Step 4: calculating an upper bound on the one-step prediction error covariance $\aleph_i(t_{k+1}|t_k)$ of the i-th sensor node at time $t_k$ by solving a matrix difference equation;

in this step, the upper bound on the one-step prediction error covariance $\aleph_i(t_{k+1}|t_k)$ is calculated according to the following equation:

$$\aleph_i(t_{k+1}|t_k) = (1 + \delta_1)A_i(t_k)\aleph_i(t_k|t_k)A_i^T(t_k) + \quad (9)$$
$$B(t_k)Q(t_k)B^T(t_k) + (1 + \delta_1^{-1})tr\{M_i(t_k)\aleph_i(t_k|t_k)M_i^T(t_k)\}D_i(t_k)D_i^T(t_k)$$

wherein, a superscript "T" represents a transpose of the matrix; $\delta_1$ is a known scaling parameter; $\delta_1^{-1}$ is an inverse of $\delta_1$; $A_i(t_k)$ is a partial derivative of the continuous and differentiable nonlinear function $f(x \ t_k)$) corresponding to a system state at the local filter $\hat{x}_i(t_k|t_k)$ at time $t_k$; $M_i(t_k)$ and $D_i(t_k)$ are known error matrices obtained by Taylor series based on $f(x(t_k))$;

$$A_i^T(t_k),$$

$$B^T(t_k),$$

$$M_i^T(t_k) \text{ and } D_i^T(t_k)$$

represent transposes of $A_i(t_k)$, $B(t_k)$, $M_i(t_k)$ and $D_i(t_k)$, respectively;

Step 5: According to $\aleph_i(t_{k+1}|t_k)$ obtained in Step 4, deriving the local distributed filter parameter $K_i(t_{k+1})$ of the i-th sensor node at time $t_{k+1}$;

in this step, the local distributed filter parameter $K_i(t_{k+1})$ is derived by minimizing a trace of the upper bound on the local filtering error covariance:

$$K_i(t_{k+1}) = \delta(\beta(t_{k+1}),1)(1+\delta_2) \aleph_i(t_{k+1}|t_k)C_i^T(t_{k+1}) \quad (10)$$
$$\overline{\Lambda}_i \Pi_i^{-1}(t_{k+1})$$

wherein, $$\prod_i (t_{k+1}) =$$
$$(1 + \delta_2)\overline{\Lambda}_i C_i(t_{k+1})\aleph_i(t_{k+1}|t_k)C_i^T(t_{k+1})\overline{\Lambda}_i + tr\{C_i(t_{k+1})\overline{X}_i(t_{k+1})C_i^T(t_{k+1})\}\hat{\Lambda}_i +$$
$$R_i(t_{k+1})\overline{X}_i(t_{k+1}) = (1 + \delta_3^{-1})\hat{x}_i(t_{k+1}|t_k)\hat{x}_i^T(t_{k+1}|t_k) + (1 + \delta_3)\aleph_i(t_{k+1}|t_k)$$

wherein, $\delta(a,b)$ is a Kronecker function and meets $$\delta(a,b) = \begin{cases} 1, & a = b \\ 0, & a \neq b \end{cases}; \beta(t_{k+1})$$

is an auxiliary variable at time $t_{k+1}$; $\delta_2$ and $\delta_3$ are known scaling parameters; $\delta_3^{-1}$ is an inverse of $\delta_3$;

$$C_i^T(t_{k+1})$$

is a transpose of $C_i(t_{k+1})$; $\hat{\Lambda}_i = \text{diag}\{(\hat{\lambda}_{i1}, \hat{\lambda}_{i2}, \ldots, \hat{\lambda}_{in_i}\}$; $\hat{x}_i^T(t_{k+1}|t_k)$ is a transpose of $\hat{x}_i(t_{k+1}|t_k)$; $\Pi_i^{-1}(t_{k+1})$ is an inverse of $\Pi_i(t_{k+1})$; $R_i(t_{k+1})$ is a covariance matrix of measurement noise $v_i(t_{k+1})$ of the i-th sensor node at time $t_{k+1}$;

Step 6: by maximizing an estimation error covariance of the eavesdropper, deriving the selection matrix $L_{ij}(t_{k+1})$ at time $t_{k+1}$;

in this step, obtaining the selection matrix $L_{ij}(t_{k+1})$ from the following optimization problem:

$$\max_{L_{ij}(t_{k+1}) \in \hat{L}_{ij}(t_{k+1})} tr\{W_{ij}(t_{k+1})\} \quad (11)$$

wherein, $$W_{ij}(t_{k+1}) = (I - L_{ij}(t_{k+1}))(2\hat{x}_j(t_{k+1}|t_k)\hat{x}_j^T(t_{k+1}|t_k) + Q_{ij}(t_{k+1}))(I - L_{ij}(t_{k+1}))$$

wherein, $$\hat{L}_{ij}(t_{k+1}) = \{L_{ij}^1(t_{k+1}), L_{ij}^2(t_{k+1}), \ldots, L_{ij}^d(t_{k+1})\},$$
$$L_{ij}^1(t_{k+1}), L_{ij}^2(t_{k+1}), \ldots, L_{ij}^{d_i}(t_{k+1})$$

are diagonal matrices with elements of 0 or 1 and a sum of the diagonal elements are $\tilde{n}_i$; $\hat{x}_j(t_{k+1}|t_k)$ represents a one-step prediction of the j-th sensor node at time $t_k$;

$$\hat{x}_j^T(t_{k+1}|t_k)$$

is a transpose of $\hat{x}_i(t_{k+1}|t_k)$; $Q_{ij}(t_{k+1})$ is a covariance matrix of artificial noise $a_{ij}(t_{k+1})$ at time $t_{k+1}$;

$$\max_x f(x)$$

represents that an objective function f(x) is maximized by selecting a decision variable x;

Step 7: substituting $K_i(t_{k+1})$ obtained in Step 5 and $L_{ij}(t_{k+1})$ obtained in Step 6 into Step 3 to obtain the fusion filter $\hat{x}_{Cf}(t_{k+1}|t_{k+1})$ at time $t_{k+1}$; determining whether $t_{k+1}$ reaches a total duration M, if $t_{k+1}$<M, performing Step 8, otherwise, ending;

Step 8: based on $K_i(t_{k+1})$ obtained in Step 5 and $L_{ij}(t_{k+1})$ obtained in Step 6, solving for the upper bound on the local filtering error covariance $\aleph_i(t_{k+1}|t_{k+1})$ of the i-th sensor node at time $t_{k+1}$; let $t_k = t_{k+1}$ and performing Step 3 until $t_{k+1}$=M is satisfied;

in this step, the upper bound on the local filtering error covariance $\aleph_i(t_{k+1}|t_{k+1})$ is calculated as follows:

$$\aleph_i(t_{k+1}|t_{k+1}) = (1 - \beta(t_{k-1}))\Delta_i(t_{k+1}) + \beta(t_{k+1})\Theta_i(t_{k+1}) \quad (12)$$

wherein, $$\Delta_i(t_{k+1}) = (1 + \delta_2)\aleph_i(t_{k+1}|t_k) + (1 + \delta_2^{-1})\varepsilon_i^2 \varnothing_i \sum_{j \in N_i} h_{ij} X_{ij}(t_{k+1}) X_{ij}^T(t_{k+1})$$

$$\Theta_i(t_{k+1}) =$$
$$(1 + \delta_2)(I - K_i(t_{k+1})\overline{\Lambda}_i C_i(t_{k+1}))\aleph_i(t_{k+1}|t_k)(I - K_i(t_{k+1})\overline{\Lambda}_i C_i(t_{k+1}))^T +$$
$$(1 + \delta_2^{-1})\varepsilon_i^2 \varnothing_i \sum_{j \in N_i} h_{ij} X_{ij}(t_{k+1}) X_{ij}^T(t_{k+1}) K_i(t_{k+1}) R_i(t_{k+1}) K_i^T(t_{k+1}) +$$
$$tr\{C_i(t_{k+1})\overline{X}_i(t_{k+1})C_i^T(t_{k+1})\}\overline{\Lambda}_i K_i(t_{k+1})K_i^T(t_{k+1})$$

$$X_{ij}(t_{k+1}) = L_{ij}(t_{k+1})\tilde{x}_{ij}(t_{k+1}) + (I - L_{ij}(t_{k+1}))\tilde{x}_{ij}^c(t_{k+1})$$

$$\tilde{x}_{ij}^c(t_{k+1}) = \hat{x}_i(t_{k+1}|t_k) - \hat{x}_{ij}^c(t_k), \tilde{x}_{ij}(t_{k+1}) = \hat{x}_i(t_{k+1}|t_k) - \hat{x}_j(t_{k+1}|t_k)$$

wherein, $\delta_2^{-1}$ is an inverse of $\delta_2$;

$$\varepsilon_i^2$$

is a square of $\varepsilon_i$; $\aleph_i(t_{k+1}|t_{k+1})$ is the upper bound on the local filtering error covariance of the i-th sensor node at time $t_{k+1}$;

$$K_i^T(t_{k+1})$$

is a transpose of $K_i(t_{k+1})$;

$$X_{ij}^T(t_{k+1})$$

is a transpose of $X_{ij}(t_{k+1})$; $(I - K_i(t_{k+1})\overline{\Lambda}_i C_i(t_{k+1}))^T$ is a transpose of $I - K_i(t_{k+1})\overline{\Lambda}_i C_i(t_{k+1})$; $\varnothing_i$ represents a penetration of the i-th sensor node;

in this step, $\aleph_i(t_{k+1}|t_{k+1})$ is calculated for each sensor node, such that $P_i(t_{k+1}|t_{k+1}) \leq \aleph_i(t_{k+1}|t_{k+1})$ holds, wherein $P_i(t_{k+1}|t_{k+1})$ is the local filtering error covariance of the i-th sensor node at time $t_{k+1}$. Furthermore, the local distributed filter parameter $K_i(t_{k+1})$ is designed by minimizing the trace of $\aleph_i(t_{k+1}|t_{k+1})$ at time $t_{k+1}$.

Embodiment: the distributed fusion filtering problem for multi-rate nonlinear systems subject to eavesdroppers and fading measurements is solved by adopting the fusion filtering method proposed in the present invention.

In the present invention, the sensor network with four sensor nodes is selected for simulation experiment with the following edge set:

$$E = \{(1,3),(1,4),(2,1),(2,4),(3,1),(3,2),(4,1),(4,3)\}$$

wherein, each ordinal pair represents the interaction of information between sensor nodes, for example, (1,3) means that the third sensor node can transmit information to the first sensor node. For (i, j) (i, j=1,2,3,4), if (i, j)∈ E, then the adjacency coefficient between the i-th sensor node and the j-th sensor node is set as $h_{ij}$=1, otherwise $h_{ij}$=0.

The system matrices are set as follows:

$$f(x(t_k)) = \begin{bmatrix} 0.35\sin(x_1(t_k)) + (1 + 0.15\cos(t_k))x_1(t_k) + 0.3x_2(t_k) \\ 0.23\sin(x_2(t_k)) - 0.25x_1(t_k) + 0.79x_2(t_k) \end{bmatrix}$$

$$B(t_k) = \begin{bmatrix} 0.18 \\ 0.18 \end{bmatrix}, C_1(s_k) = [1.4 \ 1], C_2(s_k) = [1.2 \ 1.3]$$

$$C_3(s_k) = [1.3 \ 0.9], C_4(s_k) = [1.3 \ 1.3]$$

wherein, $x(t_k) = [x_1(t_k) \ x_2(t_k)]^T$ is the state vector and the fusion filter is $\hat{x}_{Cf}(t_k|t_k) = [\hat{x}_{Cf,1}(t_k|t_k) \ \hat{x}_{Cf,2}(t_k|t_k)]^T$; sin($\square$) and cos($\square$) represent a sine function and a cosine function of "$\sqcup$".

The system-related initial values are given as $$\overline{x}(t_0) = \begin{bmatrix} 1.2 \\ 1.2 \end{bmatrix}, \hat{x}_1(t_0|t_0) = \hat{x}_2(t_0|t_0) = \hat{x}_3(t_0|t_0) = \hat{x}_4(t_0|t_0) = \begin{bmatrix} 1.2 \\ 1.2 \end{bmatrix}$$

$$\aleph_1(t_0|t_0) = \aleph_2(t_0|t_0) = \aleph_3(t_0|t_0) = \aleph_4(t_0|t_0) = \begin{bmatrix} 1 & 0 \\ 0 & 1 \end{bmatrix}$$

The other parameters are selected as $$v_1(s_k) = 0.6, v_2(s_k) = 0.8, v_3(s_k) = 0.7, v_4(s_k) = 0.6, \tilde{n}_1 = \tilde{n}_2 = \tilde{n}_3 = \tilde{n}_4 = 1$$

$$Q_{13}(t_k) = Q_{14}(t_k) = 1, Q(t_k) = 0.6,$$

$$\varepsilon_1 = \varepsilon_2 = \varepsilon_3 = \varepsilon_4 = 0.1, \delta_1 = \delta_2 = \delta_3 = 0.5$$

$$Q_{21}(t_k) = Q_{24}(t_k) = 1, \hat{\Lambda}_1 = \hat{\Lambda}_2 = \hat{\Lambda}_3 = \hat{\Lambda}_4 = 0.16, \overline{\Lambda}_1 = \overline{\Lambda}_2 = \overline{\Lambda}_3 = \overline{\Lambda}_4 = 0.8$$

$$Q_{31}(t_k) = Q_{32}(t_k) = 1, D_1(t_k) = D_2(t_k) = D_3(t_k) = D_4(t_4) = \begin{bmatrix} 0.1 & 0 \\ 0 & 0.1 \end{bmatrix}, h = 1$$

$$Q_{41}(t_k) = Q_{43}(t_k) = 1, M_1(t_k) = M_2(t_k) M_3(t_k) = M_4(t_k) = \begin{bmatrix} 0.1 & 0 \\ 0 & 0.1 \end{bmatrix}, b = 2$$

log(MSE$_i(t_k)$) and log(tr{$\aleph_i(t_k|t_k)$}) are the logarithm of the mean square error and the logarithm of the trace of the upper bound on the local filtering error covariance of the i-th sensor node at time $t_k$, respectively, wherein, log($\square$) represents a logarithm of "$\sqcup$"; MSE$_i(t_k)$ represents the mean square error of the i-th sensor node at time $t_k$. log(MSE$_{Cf}(t_k)$) and log(tr{$\aleph_{Cf}(t_k|t_k)$}) are the logarithm of the mean square error of fusion filter and the logarithm of the trace of the fusion filtering error covariance, respectively, wherein, MSE$_{Cf}(t_k)$ represents the mean square error of the fusion filter at time $t_k$. The present invention adopts the accumulated error square to demonstrate the superiority of the fusion filter, and its calculation formula is $$AES_i(t_{k+1}) = AES_i(t_k) + \|x(t_k) - \hat{x}_i(t_k|t_k)\|^2$$

$$AES_{CI}(t_{k+1}) = AES_{CI}(t_k) + \|x(t_k) - \hat{x}_{CI}(t_k|t_k)\|^2$$

wherein, $AES_i(t_k)$ represents the accumulated error square of the i-th sensor node at time $t_k$; $AES_i(t_{k+1})$ represents the accumulated error square of the i-th sensor node at time $t_{k+1}$; $AES_{CI}(t_k)$ represents the accumulated error square of the fusion filter at time $t_k$; $AES_{CI}(t_{k+1})$ represents the accumulated error square of the fusion filter at time $t_{k+1}$; $\|\square\|$ represents the norm of "$\square$"; $\|x(t_k)-\hat{x}_i(t_k|t_k)\|^2$ is the square of $\|x(t_k)-\hat{x}_i(t_k|t_k)\|$; $\|x(t_k)-\hat{x}_{CI}(t_k|t_k)\|^2$ is the square of $\|x(t_k)-\hat{x}_{CI}(t_k|t_k)\|$. In particular, the average of the mean square error is introduced to evaluate further the change of fusion filtering performance under different fading probabilities, which is defined as $$MSE'_{CI}(t_k) = \sum_{t_k=1}^{M} \log(MSE_{CI}(t_k))/M, M = 70$$

is the total duration of network operation in the present invention.

Figure 2:
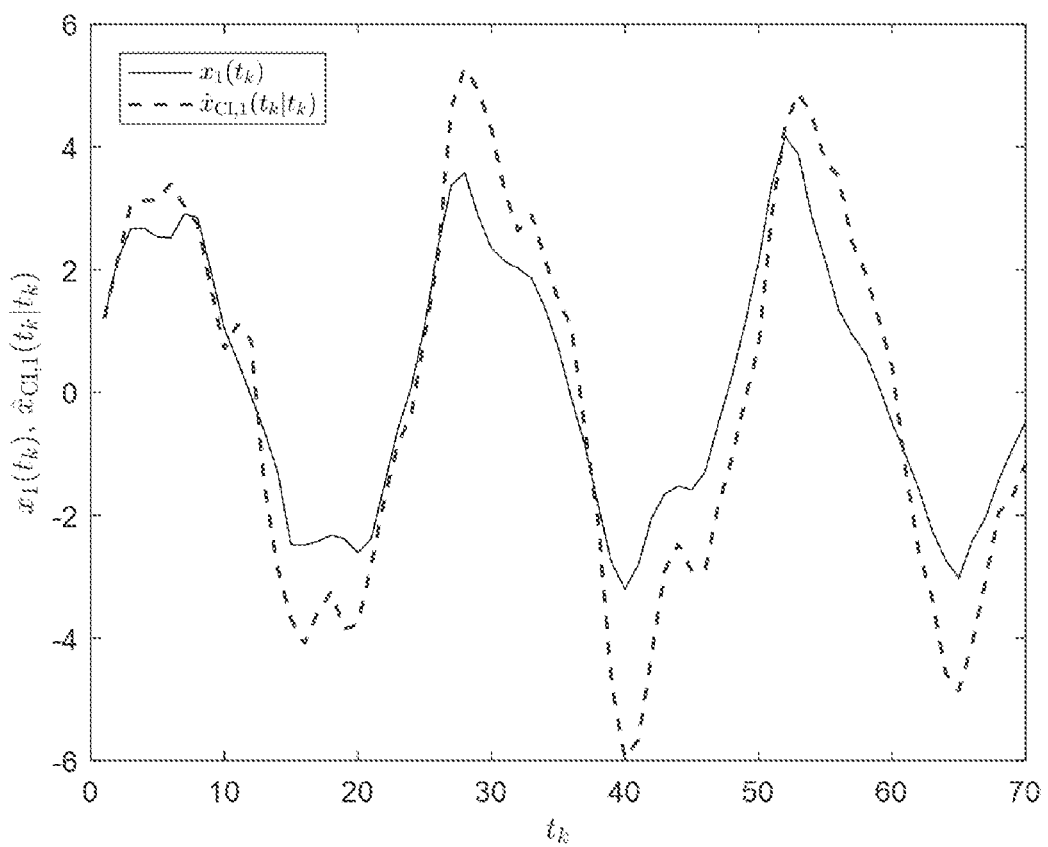
FIG. 2 shows trajectories of the first component of the actual state $x_1(t_k)$ and its fusion filter $\hat{x}_{CL1}(t_k|t_k)$ for the multi-rate nonlinear system.
Figure 3:
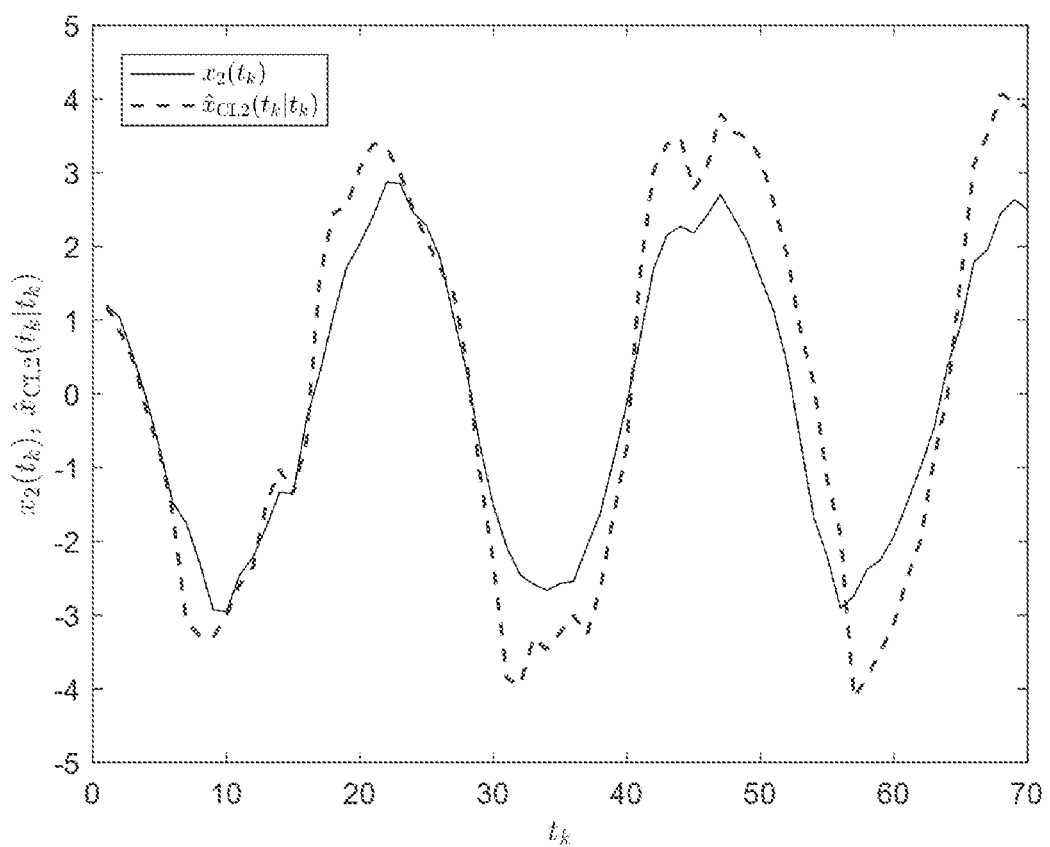
FIG. 3 shows trajectories of the second component of the actual state $x_2(t_k)$ and its fusion filter $\hat{x}_{CL2}(t_k|t_k)$ for the multi-rate nonlinear system.
Figure 4:
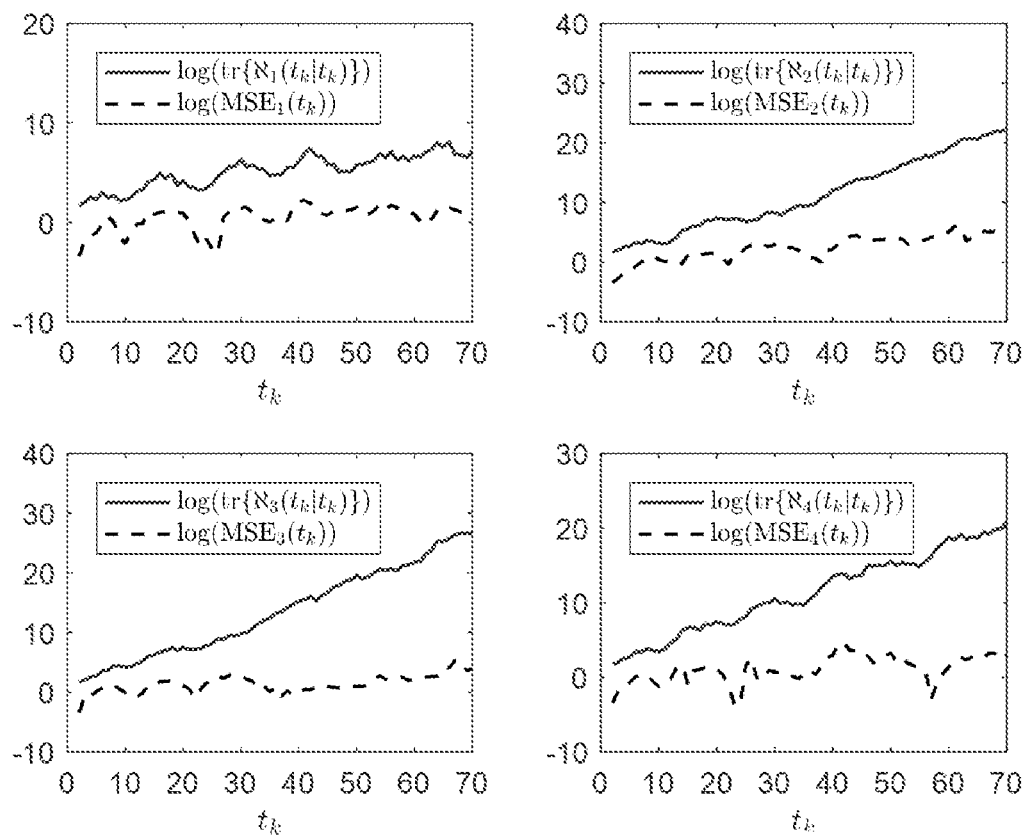
FIG. 4 shows the logarithm of the mean square error log(MSE$_i(t_k)$) and the logarithm of the trace of the minimum upper bound on the local filtering error covariance log(tr{ℵ($t_k|t_k$)}) for four sensor nodes.

Distributed Fusion Filtering Effects:

The trajectories of the actual state and its fusion filter are given in FIG. 2 and FIG. 3. The logarithm of the mean square error $\log(MSE_i(t_k))$ and the logarithm of the trace of the corresponding minimum upper bound on the local filtering error covariance $\log(tr\{\aleph_i(t_k|t_k)\})$ of four sensor nodes are depicted in FIG. 4. The experimental results show the effectiveness of the method proposed in the present invention.

Figure 5:
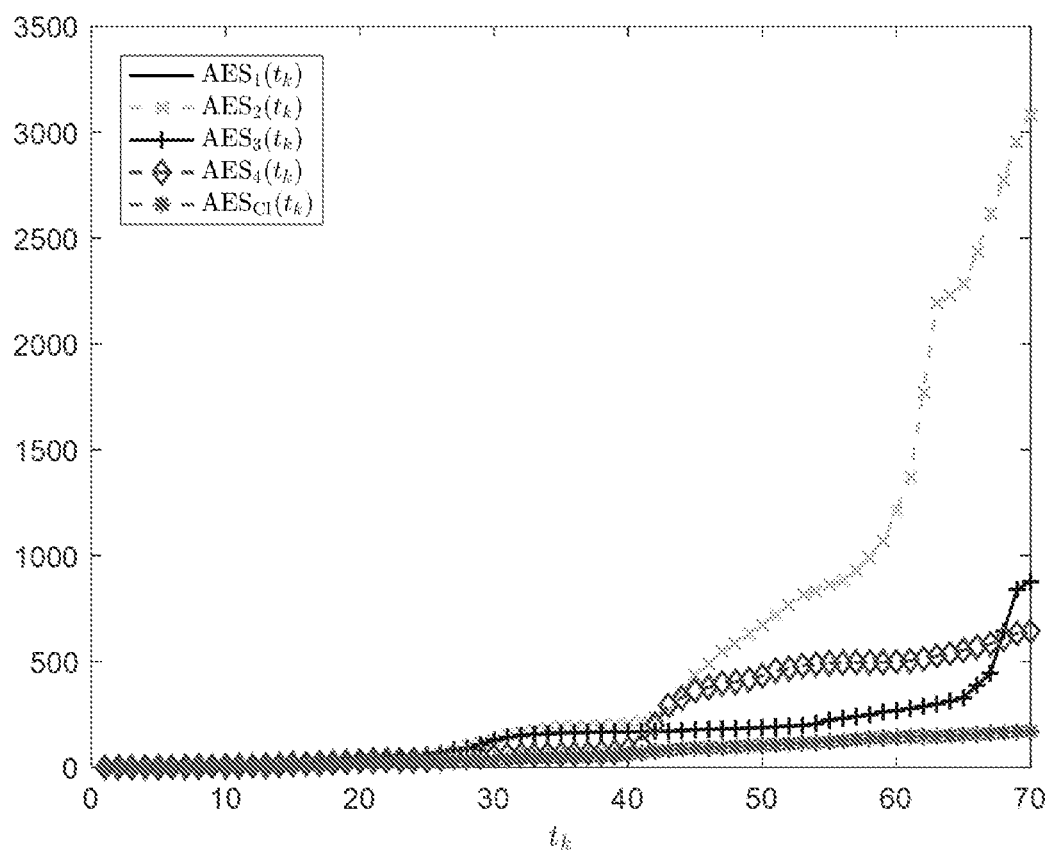
FIG. 5 shows the cumulative error square for four sensor nodes and the fusion filter.

The accumulated error square of four sensor nodes and fusion filter is given in FIG. 5. As can be seen from the figure, the accumulated error square of the fusion filter $AES_{CI}(t_k)$ is less than the accumulated error square of the i-th sensor node $AES_i(t_k)$ (i=1,2,3,4), which means that the estimation accuracy of the fusion filter is better than that of local filters. The experimental results verify the superiority of the method proposed in the present invention.

Figure 6:
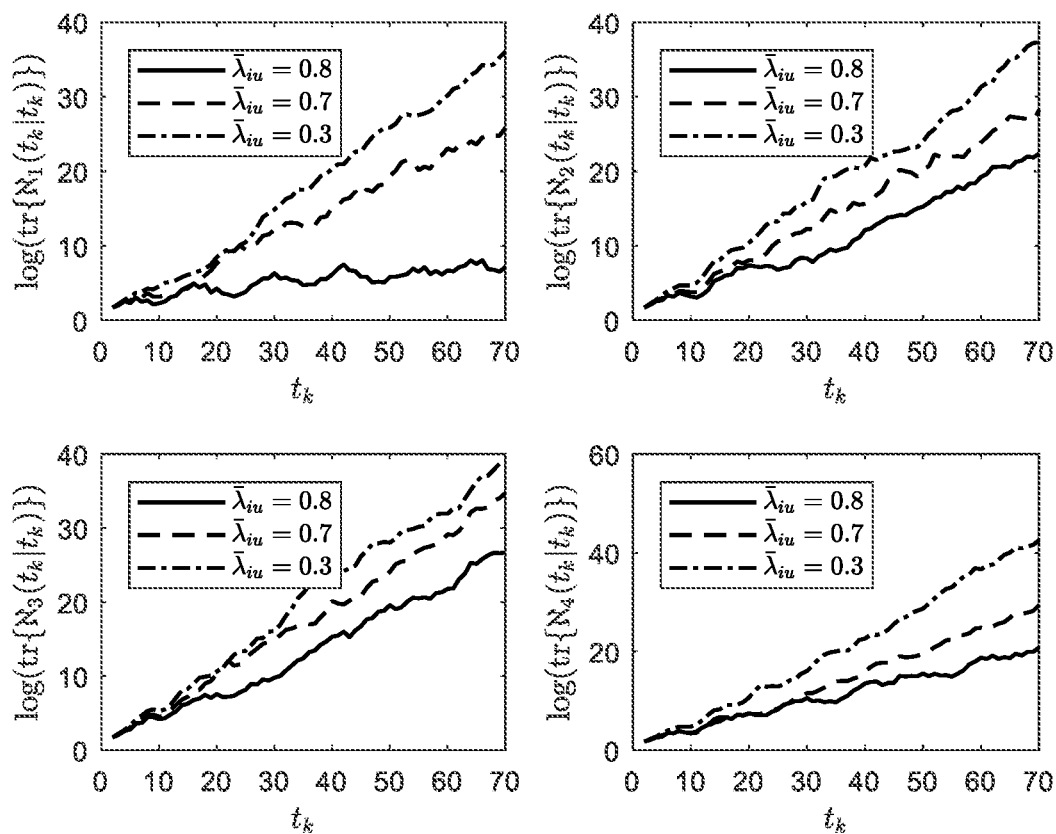
FIG. 6 shows log(tr{ℵ$_i(t_k|t_k)$}) under different fading probabilities for four sensor nodes.
Figure 7:
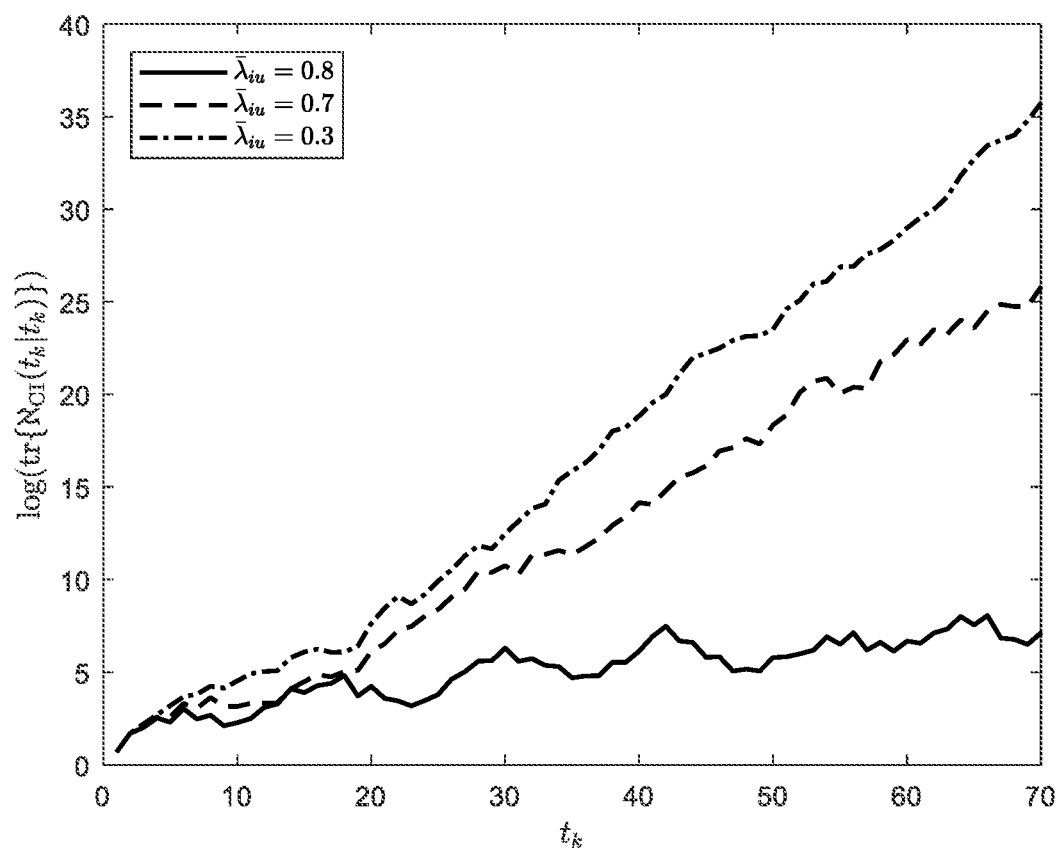
FIG. 7 shows log(tr{ℵ$_{Cf}(t_k|t_k)$}) under different fading probabilities for the fusion filter.
Figure 8:
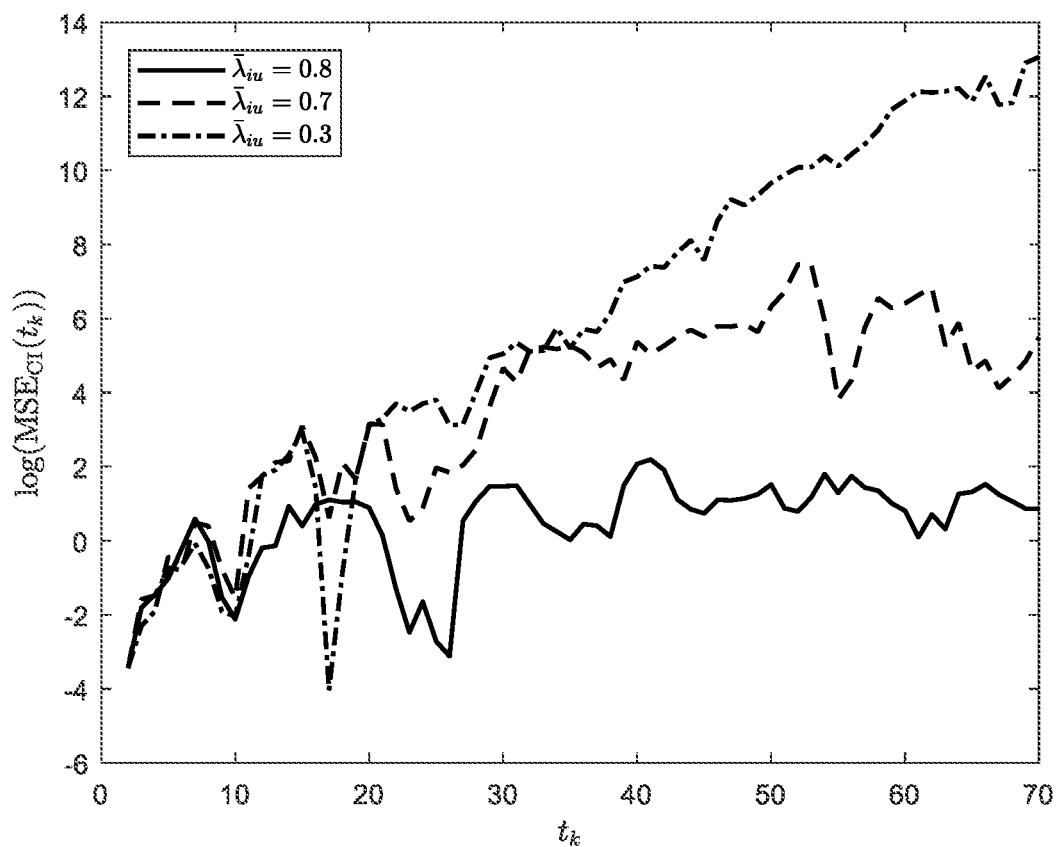
FIG. 8 shows log(MSE$_{Cf}(t_k)$) under different fading probabilities for the fusion filter.

FIGS. 6-8 show $\log(tr\{\aleph_i(t_k|t_k)\})$ of the sensor node i (i=1,2,3,4), $\log(tr\{\aleph_{CI}(t_k|t_k)\})$ and $\log(MSE_{CI}(t_k))$ of the fusion filter under different fading probabilities, respectively. It can be seen from the figures that $\log(tr\{\aleph_i(t_k|t_k)\})$, $\log(tr\{\aleph_{CI}(t_k|t_k)\})$ and $\log(MSE_{CI}(t_k))$ decrease with the increase of the fading probability $\bar{\lambda}_{iu}$, which represents that the filtering performance of the proposed anti-eavesdropping distributed fusion filtering method will become better when the increase of $\bar{\lambda}_{iu}$. Furthermore, when the fading probabilities $\bar{\lambda}_{iu}$ are 0.8, 0.7 and 0.3, the average mean square errors of the fusion filter are 0.4251, 3.6143 and 5.7976, i.e., when the fading probability rises from 0.3 to 0.7, the average mean square error is reduced by approximately 37%; and when it increases from 0.7 to 0.8, the reduction is approximately 88%.

In summary, the anti-eavesdropping distributed fusion filtering method over sensor network proposed in the present invention can also effectively estimate the system state in spite of simultaneously considering fading measurements and eavesdroppers.

Finally, it should be noted that the above embodiment is only the description of the technical solution of the present invention and is not limited to the scope of protection of the present invention. Although the present invention is described in detail in conjunction with the above embodiment, those having ordinary skill in the art should understand that those having ordinary skill, after reading the description of the present invention, can still make changes, modifications or equivalent replacements in the embodiment, and such changes, modifications and equivalent replacements shall fall within the scope of protection of the claims.

What is claimed is:

1. An anti-eavesdropping distributed fusion filtering method for a multi-rate nonlinear system, comprising the following steps:

Step 1: establishing a dynamic model for the multi-rate nonlinear system over sensor networks:

$$x(t_{k+1}) = \int (x(t_k)) + B(t_k)\omega(t_k)$$

$$y_i(s_k) = \Lambda_i(s_k)C_i(s_k)x(s_k) + v_i(s_k)$$

wherein, $t_k$ is a state update instant of the multi-rate nonlinear system; $x(t_k)$ is a state vector of the multi-rate nonlinear system at time $t_k$; $x(t_{k+1})$ is a state vector of the multi-rate nonlinear system at time $t_{k+1}$; $f(x(t_k))$ is a continuous and differentiable nonlinear function with a bounded second-order derivative of the multi-rate nonlinear system at time $t_k$; $B(t_k)$ is a coefficient matrix of process noise at time $t_k$; $\omega(t_k)$ is process noise with zero mean and covariance $Q(t_k)$ at time $t_k$; i is a label of sensor nodes, i=1,2, . . . , N, N represents a number of sensor nodes; $s_k$ is a measurement sampling instant of sensor; $x(s_k)$ is a state vector of the multi-rate nonlinear system at time $s_k$; $y_i(s_k)$ is a measurement output signal of an i-th sensor node in the multi-rate nonlinear system at time $s_k$; $C_i(s_k)$ is a measurement matrix of the i-th sensor node based on the multi-rate nonlinear system at time $s_k$; $v_i(s_k)$ is measurement noise of the i-th sensor node in the multi-rate nonlinear system at time $s_k$; $\Lambda_i(s_k)$ is used to describe a phenomenon of fading measurements;

Step 2: transforming the dynamic model for the multi-rate nonlinear system over sensor networks in Step 1 into a single-rate nonlinear system dynamic model through a prediction compensation strategy:

$$\bar{y}_i(t_k) = (1-\beta(t_k))\bar{\Lambda}_i C_i(t_k)\hat{x}_i(t_k|t_{k-1}) + \beta(t_k)y_i(t_k)$$

$$\beta(t_k) = \begin{cases} 1, & t_k = s_t, t = 0, 1, 2, \ldots \\ 0, & \text{otherwise} \end{cases}$$

wherein, $\bar{y}_i(t_k)$ is a measurement output signal of the i-th sensor node in a single-rate nonlinear system at time $t_k$; $\beta(t_k)$ is an auxiliary variable; $C_i(t_k)$ is a measurement matrix of the i-th sensor node based on the single-rate nonlinear system at time $t_k$; $\hat{x}_i(t_k|t_{k-1})$ is a one-step prediction of the i-th sensor node at time $t_{k-1}$; $\bar{\Lambda}_i$=diag$\{\bar{\lambda}_{i1}, \bar{\lambda}_{i2}, \ldots, \bar{\lambda}_{in_y}\}$; $n_y$ is a dimension of $y_i(s_k)$; $\bar{\lambda}_{iu}$ is an expectation of a random variable $\lambda_{iu}(s_k)$, u=1,2, . . . , $n_y$; $y_i(t_k)$ is a measurement output signal of the i-th sensor node in the multi-rate nonlinear system at time $t_k$; $s_t$ is the measurement sampling instant of sensor node;

Step 3: designing an anti-eavesdropping distributed fusion filter for the single-rate nonlinear system dynamic model in Step 2; wherein Step 3a: when a sensor node exchanges information, in order to prevent transmitted data from being eavesdropped by an eavesdropper and ensure a security of information transmission, adding artificial noise to the one-step prediction $\hat{x}_j(t_k|t_{k-1})$ of a sensor node j before $\hat{x}_j(t_k|t_{k-1})$ being sent to the sensor node i:

$$\hat{x}_{ij}^o(t_k) = L_{ij}(t_k)\hat{x}_j(t_k \mid t_{k-1}) + (I - L_{ij}(t_k))a_{ij}(t_k)$$

wherein, $j \in N_i$, $N_i$ is a set of neighboring nodes of the i-th sensor node; $\hat{x}_j(t_k|t_{k-1})$ represents a one-step prediction of the j-th sensor node at time $t_{k-1}$;

$\hat{x}_{ij}^o(t_k)$ is a transmitted message from the sensor node j to the sensor node i at time $t_k$; I is an $n_x$-dimensional identity matrix; $n_x$ is a dimension of the state vector $x(t_k)$; $a_{ij}(t_k)$ is the artificial noise with zero mean and covariance $Q_{ij}(t_k)$ at time $t_k$; $L_{ij}(t_k)$ is a selection matrix at time $t_k$;

Step 3b: when the sensor node i receives the information $\hat{x}_{ij}^o(t_k)$ transmitted by the sensor node j, obtaining a compensated one-step prediction at time $t_k$ according to a zero-order holder compensation rule:

$$\hat{x}_{ij}^c(t_k) = L_{ij}(t_k)\hat{x}_{ij}^o(t_k) + (I - L_{ij}(t_k))\hat{x}_{ij}^c(t_{k-1})$$

wherein, $\hat{x}_{ij}^c(t_k)$ is the compensated one-step prediction at time $t_k$;

$\hat{x}_{ij}^c(t_{k-1})$ is a compensated one-step prediction at time $t_{k-1}$;

Step 3c: designing a local distributed filter:

$$\hat{x}_i(t_{k+1}|t_k) = f(\hat{x}_i(t_k|t_k))\hat{x}_i(t_{k+1}|t_{k+1}) = \hat{x}_i(t_{k+1}|t_k) +$$
$$K_i(t_{k+1})\left(\bar{y}_i(t_{k+1}) - \bar{\Lambda}_i C_i(t_{k+1})\hat{x}_i(t_{k+1}|t_k)\right) + \varepsilon_i \sum_{j \in N_i} h_{ij}\left(\hat{x}_i(t_{k+1}|t_k) - \hat{x}_{ij}^c(t_{k+1})\right)$$

wherein, $\hat{x}_i(t_{k+1}|t_k)$ represents a one-step prediction of the i-th sensor node at time $t_k$;

$\hat{x}_{ij}^c(t_{k+1})$ represents a compensated one-step prediction at time $t_{k+1}$; $\hat{x}_i(t_{k+1}|t_{k+1})$ represents a filter of the i-th sensor node at time $t_{k+1}$; $\hat{x}_i(t_k|t_k)$ represents a filter of the i-th sensor node at time $t_k$; $f(\hat{x}_i(t_k|t_k))$ represents a nonlinear function filtering form based on the single-rate nonlinear system of the i-th sensor node at time $t_k$; $K_i(t_{k+1})$ represents a local distributed filter parameter of the i-th sensor node at time $t_{k+1}$; $\bar{y}_i(t_{k+1})$ represents a measurement output signal of the i-th sensor node in the single-rate nonlinear system at time $t_{k+1}$; $C_i(t_{k+1})$ is a measurement matrix of the i-th sensor node based on the single-rate nonlinear system at time $t_{k+1}$; $\varepsilon_i$ represents a predefined consensus parameter of the i-th sensor node; $h_{ij}$ represents a connection coefficient between the i-th sensor node and the j-th sensor node; and Step 3d: obtaining an anti-eavesdropping distributed fusion filter based on a local filter $\hat{x}_i(t_k|t_k)$ and a covariance intersection fusion criterion:

$$\aleph_{CI}(t_k|t_k) = \left(\sum_{i=1}^{N} \omega_i \aleph_i^{-1}(t_k|t_k)\right)^{-1}$$

$$\hat{x}_{CI}(t_k|t_k) = \aleph_{CI}(t_k|t_k)\sum_{i=1}^{N} \omega_i \aleph_i^{-1}(t_k|t_k)\hat{x}_i(t_k|t_k)$$

wherein, a superscript "−1" represents an inverse of a matrix; $\hat{x}_{CI}(t_k|t_k)$ is a fusion filter at time $t_k$; $\aleph_{CI}(t_k|t_k)$ is fusion filtering error covariance at time $t_k$; $\aleph_i(t_k|t_k)$ is an upper bound on a local filtering error covariance of the i-th sensor node at time $t_k$;

$\aleph_i^{-1}(t_k|t_k)$ is an inverse of a matrix $$\aleph_i(t_k|t_k); \left(\sum_{i=1}^{N} \omega_i \aleph_i^{-1}(t_k|t_k)\right)^{-1}$$

is an inverse of a matrix $$\sum_{i=1}^{N} \omega_i \aleph_i^{-1}(t_k|t_k);$$

$\omega_i$ is a scalar;

Step 4: calculating an upper bound on the one-step prediction error covariance $\aleph_i(t_{k+1}|t_k)$ of the i-th sensor node at time $t_k$ by solving a matrix difference equation:

$$\aleph_i(t_{k+1}|t_k) = (1 + \delta_1)A_i(t_k)\aleph_i(t_k|t_k)A_i^T(t_k) +$$
$$B(t_k)Q(t_k)B^T(t_k) + (1 + \delta_1^{-1})tr\{M_i(t_k)\aleph_i(t_k|t_k)M_i^T(t_k)\}D_i(t_k)D_i^T(t_k)$$

wherein, a superscript "T" represents the transpose of a matrix; $\delta_1$ is a known scaling parameter; $\delta_1^{-1}$ is an inverse of $\delta_1$; $A_i(t_k)$ is a partial derivative of the continuous and differentiable nonlinear function f(x($t_k$)) corresponding to a system state at the local filter $\hat{x}_i(t_k|t_k)$ at time $t_k$; $M_i(t_k)$ and $D_i(t_k)$ are known error matrices obtained by Taylor series based on $f(x(t_k))$;

$A_i^T(t_k)$, $B^T(t_k)$, $M_i^T(t_k)$ and $D_i^T(t_k)$ represent transposes of $A_i(t_k)$, $B(t_k)$, $M_i(t_k)$ and $D_i(t_k)$, respectively;

Step 5: according to $\aleph_i(t_{k+1}|t_k)$ obtained in Step 4, deriving the local distributed filter parameter $K_i(t_{k+1})$ of the i-th sensor node at time $t_{k+1}$ by minimizing a trace of the upper bound on the local filtering error covariance:

$$K_i(t_{k+1}) = \delta(\beta(t_{k+1}),1)(1+\eth_2)\aleph_i(t_{k+1}|t_k)C_i^T(t_{k+1})\overline{A}_i \Pi_i^{-1}(t_{k+1})$$

wherein, $$\Pi_i(t_{k+1}) =$$

$$(1+\eth_2)\overline{A}_i C_i(t_{k+1})\aleph_i(t_{k+1}|t_k)C_i^T(t_{k+1})\overline{A}_i + tr\{C_i(t_{k+1})\overline{X}_i(t_{k+1})C_i^T(t_{k+1})\}\hat{A}_i +$$
$$R_i(t_{k+1})\overline{X}_i(t_{k+1}) = \left(1 + \eth_3^{-1}\right)\hat{x}_i(t_{k+1}|t_k)\hat{x}_i^T(t_{k+1}|t_k) + (1+\eth_3)\aleph_i(t_{k+1}|t_k)$$

wherein, $\delta(a,b)$ is a Kronecker function; $\beta(t_{k+1})$ is an auxiliary variable at time $t_{k+1}$; $\eth_2$ and $\eth_3$ are known scaling parameters; $\eth_3^{-1}$ is an inverse of $\eth_3$;

$$C_i^T(t_{k+1})$$

is a transpose of $C_i(t_{k+1})$;

$$\hat{x}_i^T(t_{k+1}|t_k)$$

is a transpose of $\hat{x}_i(t_{k+1}|t_k)$; $\Pi_i^{-1}(t_{k+1})$ is an inverse of $\Pi_i(t_{k+1})$; $R_i(t_{k+1})$ is a covariance matrix of measurement noise $v_i(t_{k+1})$ of the i-th sensor node at time $t_{k+1}$;

Step 6: by maximizing an estimation error covariance of the eavesdropper, deriving the selection matrix $L_{ij}(t_{k+1})$ at time $t_{k+1}$ from the following optimization problem:

$$\max_{L_{ij}(t_{k+1}) \in \hat{L}_{ij}(t_{k+1})} tr\{W_{ij}(t_{k+t})\}$$

wherein, $$W_{ij}(t_{k+1}) = (I - L_{ij}(t_{k+1}))\left(2\hat{x}_j(t_{k+1}|t_k)\hat{x}_j^T(t_{k+1}|t_k) + Q_{ij}(t_{k-1})\right)(I - L_{ij}(t_{k-1}))$$

wherein, $$\hat{L}_{ij}(t_{k+1}) = \{L_{ij}^1(t_{k+1}), L_{ij}^2(t_{k+1}), \ldots, L_{ij}^{d_i}(t_{k+1})\},$$

$$L_{ij}^1(t_{k+1}), L_{ij}^2(t_{k+1}), \ldots, L_{ij}^{d_i}(t_{k+1})$$

are diagonal matrices with elements of 0 or 1 and a sum of the diagonal elements are $\tilde{n}_i$; $\hat{x}_j(t_{k+1}|t_k)$ represents a one-step prediction of the j-th sensor node at time $t_k$;

$$\hat{x}_j^T(t_{k+1}|t_k)$$

is a transpose of $\hat{x}_j(t_{k+1}|t_k)$; $Q_{ij}(t_{k+1})$ is a covariance matrix of artificial noise $a_{ij}(t_{k+1})$ at time $t_{k+1}$;

$$\max_x f(x)$$

represents that an objective function f(x) is maximized by selecting a decision variable x;

Step 7: substituting $K_i(t_{k+1})$ obtained in Step 5 and $L_{ij}(t_{k+1})$ obtained in Step 6 into Step 3 to obtain the fusion filter $\hat{x}_{Ci}(t_{k+1}|t_{k+1})$ at time $t_{k+1}$; determining whether $t_{k+1}$ reaches a total duration M, if $t_{k+1}<M$, performing Step 8, otherwise, ending;

Step 8: based on $K_i(t_{k+1})$ obtained in Step 5 and $L_{ij}(t_{k+1})$ obtained in Step 6, solving for the upper bound on the local filtering error covariance $\aleph_i(t_{k+1}|t_{k+1})$ of the i-th sensor node at time $t_{k+1}$:

$$\aleph_i(t_{k+1}|t_{k+1}) = (1-\beta(t_{k+1}))\Delta_i(t_{k+1}) + \beta(t_{k+1})\Theta_i(t_{k+1})$$

wherein, $$\Delta_i(t_{k+1}) = (1+\eth_2)\aleph_i(t_{k+1}|t_k) + \left(1+\eth_2^{-1}\right)\varepsilon_i^2\phi_i\sum_{j\in N_i}h_{ij}X_{ij}(t_{k+1})X_{ij}^T(t_{k+1})$$

$$\Theta_i(t_{k+1}) = (1+\eth_2)\left(I - K_i(t_{k+1})\overline{A}_i C_i(t_{k+1})\right)\aleph_i(t_{k+1}|t_k)\left(I - K_i(t_{k+1})\overline{A}_i C_i(t_{k+1})\right)^T +$$
$$\left(1+\eth_2^{-1}\right)\varepsilon_i^2\phi_i\sum h_{ij}X_{ij}(t_{k+1})X_{ij}^T(t_{k+1}) + K_i(t_{k+1})R_i(t_{k+1})K_i^T(t_{k+1}) +$$
$$tr\{C_i(t_{k+1})\overline{X}_i(t_{k+1})C_i^T(t_{k+1})\}\hat{A}_i K_i(t_{k+1})K_i^T(t_{k+1})$$

$$X_{ij}(t_{k+1}) = L_{ij}(t_{k+1})\tilde{x}_{ij}(t_{k+1}) + (I - L_{ij}(t_{k+1}))\tilde{x}_{ij}^c(t_{k+1})$$

$$\tilde{x}_{ij}^c(t_{k+1}) = \hat{x}_i(t_{k+1}|t_k) - \hat{x}_{ij}^c(t_k), \tilde{x}_{ij}(t_{k+1}) = \hat{x}_i(t_{k+1}|t_k) - \hat{x}_j(t_{k+1}|t_k)$$

wherein, $\eth_2^{-1}$ is an inverse of $\eth_2$;

$$\varepsilon_i^2$$

is a square of $\varepsilon_i$; $\aleph_i(t_{k+1}|t_{k+1})$ is the upper bound on the local filtering error covariance of the i-th sensor node at time $t_{k-1}$;

$$K_i^T(t_{k+1})$$

is a transpose of $K_i(t_{k+1})$;

$$X_{ij}^T(t_{k+1})$$

is a transpose of $X_{ij}(t_{k+1})$; $(I-K_i(t_{k+1})\overline{\Lambda}_i C_i(t_{k+1}))^T$ is a transpose of $I-K_i(t_{k+1})\overline{\Lambda}_i C_o(t_{k+1})$; $\emptyset_i$ represents a penetration of the i-th sensor node;

let $t_k = t_{k+1}$ and performing Step 3 until $t_{k+1} = M$ is satisfied; and

Step 9: estimating the multi-rate nonlinear system when simultaneously considering eavesdroppers and fading measurements for transmitted data via the sensor network, wherein when a fading probability rises from 0.3 to 0.7, an average mean square error is reduced by approximately 37%; and when the fading probability increases from 0.7 to 0.8, a reduction in the average mean square error is approximately 88%, thus improving an accuracy of a filtering performance of such problems and wherein the updated eavesdroppers and fading measurements presents a complexity of transmitted measurements of the nonlinear system to an environment monitoring computer display indicating accuracy of filtering performance.

2. The anti-eavesdropping distributed fusion filtering method for the multi-rate nonlinear system according to claim 1, wherein in Step 1, any two adjacent measurement sampling instants $s_k$ and $s_{k+1}$ satisfy $s_{k+1} - s_k = bh$, bh is a measurement sampling period of sensor node, and b is a positive integer.

3. The anti-eavesdropping distributed fusion filtering method for the multi-rate nonlinear system according to claim 1, wherein in Step 1, $\Lambda_i(s_k) = \mathrm{diag}\{\lambda_{i1}(s_k), \lambda_{i2}(s_k), \ldots, \lambda_{in_x}(s_k)\}$, $\mathrm{diag}\{\square\}$ represents a diagonal matrix composed of elements " $\lrcorner$ ", an element $\lambda_{iu}(s_k)$ is a random variable distributed over an interval [0,1], which meets $E\{\lambda_{iu}(s_k)\} = \overline{\lambda}_{iu}$ and $E\{(\lambda_{iu}(s_k) - \overline{\lambda}_{iu})^2\} = E\{(\tilde{\lambda}_{iu}^2(s_k)\} = \hat{\lambda}_{iu}$, $\overline{\lambda}_{iu}$ and $\hat{\lambda}_{iu}$ are expectation and variance of the random variable $\lambda_{iu}(s_k)$, respectively, and $E\{\square\}$ is a mathematical expectation.

4. The anti-eavesdropping distributed fusion filtering method for the multi-rate nonlinear system according to claim 1, wherein in Step 3a, $$L_{ij}(t_k) = \mathrm{diag}\{\ell_{ij}^1(t_k), \ell_{ij}^2(t_k), \ldots, \ell_{ij}^{n_x}(t_k)\},$$

elements $$\ell_{ij}^1(t_k), \ell_{ij}^2(t_k), \ldots, \ell_{ij}^{n_x}(t_k)$$

satisfy $$\ell_{ij}^m j(t_k) \in \{0, 1\} (m = 1, 2, \ldots, n_x)$$

and $$\sum_{m=1}^{n_x} \ell_{ij}^m(t_k) = \tilde{n}_i, \tilde{n}_i$$

is a constant that is pre-designed according to an actual demand, and "Σ" is a summation symbol.

5. The anti-eavesdropping distributed fusion filtering method for the multi-rate nonlinear system according to claim 4, wherein, $L_{ij}(t_k) \in \hat{L}_{ij}(t_k)$, $$\hat{L}_{ij}(t_k) = \{L_{ij}^1(t_k), L_{ij}^2(t_k), \ldots, L_{ij}^{d_i}(t_k)\},$$

$$L_{ij}^1(t_k), L_{ij}^2(t_k), \ldots, L_{ij}^{d_i}(t_k)$$

are all diagonal matrices with elements of 0 or 1 and the sum of the diagonal elements is $\tilde{n}_i$, and $$d_i = C_{n_x}^{\tilde{n}_i}, C_{n_x}^{\tilde{n}_i}$$

represents a number of combinations.

6. The anti-eavesdropping distributed fusion filtering method for the multi-rate nonlinear system according to claim 1, wherein in Step 3d, $\omega_i$ is obtained by a following optimization problem:

$$\min_{\omega_i} tr\{\aleph_{Cf}(t_k|t_k)\}$$

$$\text{s.t.} \sum_{i=1}^{N} \omega_i = 1, \omega_i \geq 0$$

wherein, $tr\{\square\}$ is a trace of a corresponding matrix, $$\min_x f(x)$$

means that the objective function f(x) is minimized by selecting the decision variable x, and s.t. is an abbreviation for "subject to".

7. The anti-eavesdropping distributed fusion filtering method for the multi-rate nonlinear system according to claim 1, wherein in Step 5, $$\delta(a, b) = \begin{cases} 1, & a = b \\ 0, & a \neq b \end{cases}.$$

8. The anti-eavesdropping distributed fusion filtering method for the multi-rate nonlinear system according to claim 1, wherein in Step 8, $\aleph_i(t_{k+1}|t_{k+1})$ is calculated for each sensor node, such that $P_i(t_{k+1}|t_{k+1}) \leq \aleph_i(t_{k+1}|t_{k+1})$ holds, wherein $P_i(t_{k+1}|t_{k+1})$ is the local filtering error covariance of the i-th sensor node at time $t_{k+1}$.

* * * * *